April 10, 1956  A. F. MILLIDGE ET AL  2,741,623
PROCESS FOR THE LIQUID PHASE OXIDATION
OF OLEFINES WITH OXYGEN
Filed Oct. 17, 1951
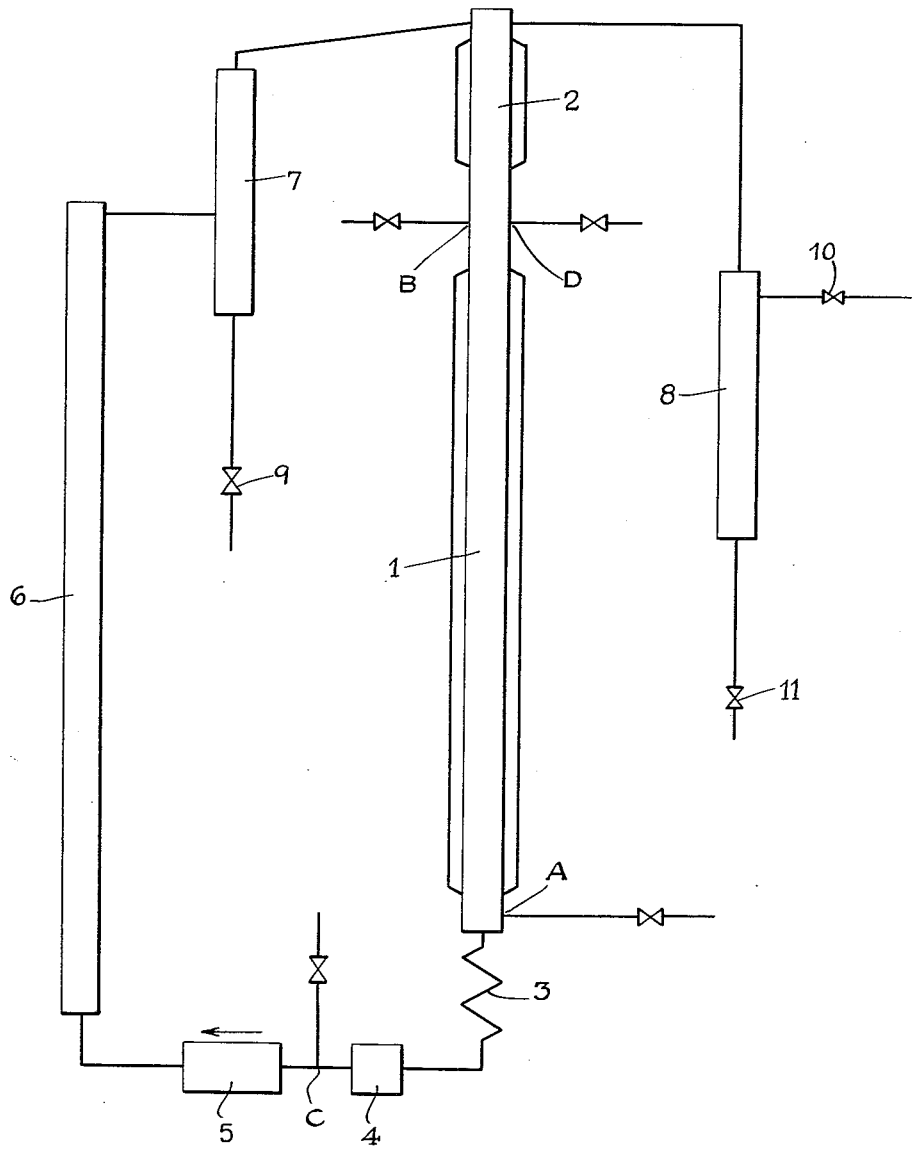
INVENTORS.
ALFRED FRANK MILLIDGE.
WILLIAM WEBSTER.
BY
Their ATTORNEYS.

United States Patent Office 2,741,623
Patented Apr. 10, 1956

2,741,623

PROCESS FOR THE LIQUID PHASE OXIDATION OF OLEFINES WITH OXYGEN

Alfred Frank Millidge, Coulsdon, and William Webster, Epsom, England

Application October 17, 1951, Serial No. 251,676

Claims priority, application Great Britain October 26, 1950

14 Claims. (Cl. 260—348.5)

The present invention relates to the oxidation of lower olefines and the manufacture thereby of oxygenated products especially alkylene oxides. It refers in particular to the manufacture of alkylene oxides from olefines with not less than 3 carbon atoms in the molecule and to the oxidation of said olefines in the liquid phase by means of molecular oxygen.

It is known that olefines can be oxidised in the liquid phase with molecular oxygen in the presence of metalliferous catalysts such as salts of cobalt, vanadium, manganese, copper, and that when the oxidation is effected at higher temperatures and pressures a number of oxidation products are obtained amongst which alcohols, aldehydes, ketones, ethers, epoxides, acids and esters have been enumerated. It has further been suggested that the yields of epoxides may be improved by the addition to the olefines of alkaline substances capable of neutralising acids formed during the oxidation. In the case of lower olefines where high pressure has to be used in order to ensure that the olefine is present in the liquid state and that a satisfactory rate of oxidation is achieved, the use of alkaline substances which are insoluble is technically difficult or not feasible, while the use of soluble alkaline compounds leads to the formation of resinous and coloured material.

It is an object of the present invention to conduct the known oxidation process in such a manner that a comparatively high proportion of valuable products are produced from the olefines serving as starting materials. It is a further object to obtain a high yield of epoxides by the oxidation.

The invention accordingly comprises the novel processes and steps of processes, specific embodiments of which are described hereinafter by way of example and in accordance with which we now prefer to practice the invention.

It has been found that when the oxidation of lower olefines is effected in the liquid phase and at temperatures between 100 and 180° C. and pressures which are sufficiently high to ensure that the olefine is present in the reaction mixture in the liquid phase, the yields of epoxides are considerably increased by passing at least part of the mixture resulting from the oxidation reaction after withdrawal from the reaction zone through a zone in which the acids formed during the oxidation reaction are removed, and recycling the thus treated reaction mixture to the oxidation reaction zone. The removal of the acids may be complete or partial.

The olefines which may be treated according to the process of the present invention are those which contain not less than 3 carbon atoms in the molecule and which are liquid under the pressure conditions used within the stated temperature range between 100 and 180° C. Exemplary for such olefines are propylene, butenes preferably n-butenes, pentenes such as pentene-1 or pentene-2, hexenes such as hexene-1 and methyl pentene, heptenes such as the heptene cuts from petroleum sources, octenes such as alpha and beta di-isobutene. The process of the invention may be applied with particular benefit to the oxidation of n-butene-2 and the production therefrom of butene-2:3-epoxide as shown in the examples, but it is to be understood that the process of the invention is not restricted to this olefine.

The process of the invention can be carried out in various ways. One method of extracting the acids comprises passing part or the whole of the reaction mixture issuing from the oxidation reactor through a layer of solid neutralising agents. Such agents are for instance the oxides or hydroxides of alkaline earths. According to another preferred method, part or the whole of the said reaction mixture is passed through an aqueous medium contained, for instance, in a separate extraction chamber by which the acids are completely or partly removed. In order to facilitate the extraction from the reaction mixture of acids, it is advantageous to add to the extracting medium suitable neutralising agents such as alkali metal hydroxides, carbonates or other substances which are able to neutralise the extracted acids and thus increase the extraction efficiencies. Salts of weak acids may also be used. Although it is preferred to use neutralising agents soluble in the medium because these salts offer less difficulties during the pumping and handling under pressure, it is also possible to use less soluble neutralising agents such as the hydroxides or carbonates of alkaline earths which may be employed as suspensions.

Suitable salts may be added to the aqueous alkaline medium whereby the solubility of oxidation products other than acids is diminished and the removal of these non-acidic products from the reaction mixture, if desired reduced. It is preferred to add these salts in large amounts to the aqueous medium for the removal of acids, since a high concentration of salts therein leads also to the retention of water in said medium and water is thus prevented from being introduced with the reaction liquid which is returned to the oxidation zone after extraction of the acid. The presence of water to any large extent in the reaction liquid to be oxidised promotes the hydrolysis of oxides formed during the oxidation.

The treatment of the reaction mixture according to the process of the invention, may be carried out by either bringing the whole reaction mixture coming from the oxidation zone in contact with said extracting medium and recycling to the oxidation zone the mixture after the acids and any other extractable material have been removed therefrom or by diverting a part of the reaction mixture to the extraction chamber, recycling the remainder of said mixture to the oxidation zone and joining therewith the part thereof after it has undergone the extraction treatment. The temperature in the acid removal zone is preferably maintained below that at which the oxidation process is effected. Temperatures which will lead to hydrolysis of the desired final products should be avoided and it is advantageous to use temperatures not higher than about 50° C. For the regulation of the temperature the extraction vessel may be fitted with suitable cooling coils, or the reaction mixture coming from the oxidation zone may be passed through coolers before entering the extraction chamber. Direct cooling may be also effected by means of the liquid extraction medium.

By such a procedure we obtain the advantages of higher speed of oxidation, associated with the higher temperature of oxidation, coupled with the advantage of neutralising the acids at lower temperature, i. e. avoiding contact of the alkaline medium with the hot oxidate.

The extraction treatment may be carried out at a pressure above, equal to, or below the pressure prevailing in the oxidation zone provided that the reaction mixture is maintained in the liquid state.

It is an additional feature of the invention to bring either part or the whole of the liquid reaction mixture into counter-current contact with the liquid extracting medium. This may be done by passing the reaction liquid into the bottom of an extraction column at whose top the extraction medium is continuously fed. The proportion of the reaction mixture subjected to the treatment by the extraction medium or the rate of circulation of the total reaction liquid should be adjusted in such a manner that a substantial part of the acids formed are removed. When the total liquid is subjected to the process of the invention it is preferred to circulate the liquid at such a rate that at least 3 times the volume contained in the oxidation reactors is circulated per hour.

The acidic products formed during the oxidation include formic acid which exerts a particularly strong hydrolysing action. It is therefore an additional feature of the present invention to eliminate as far as possible the formic acid without necessarily removing at the same time all the other acids made during the oxidation. In order to achieve this, the reaction liquid may be extracted in the removal zone according to this invention with a solution of salts of acids which may be present in the reaction mixture but are weaker than formic acid. Such salts are, for instance, the salts of acetic acid.

By the treatment according to the invention, in addition to the acids, the alkylene oxides may also be removed from the oxidised reaction mixture by the extracting medium. This applies in particular to the oxidation of butenes and the production thereby of butene epoxides. If the process is arranged to do this the extract is distilled and the corresponding epoxide isolated thereby.

Since the acid tends to hydrolyse the epoxide in an aqueous medium and thereby reduce the ultimate yield of the expoxide, it is advantageous to neutralise the acid either partly or completely or to carry out the extraction treatment and the subsequent isolation of the epoxide by distillation at as low a temperature as possible, or to combine these two features. The distillation of the aqueous medium is therefore effected advantageously under reduced pressure.

The process of the invention may be carried out batchwise or in a continuous manner. In the latter case a fraction of the reaction mixture is withdrawn continuously or intermittently and worked up for the desired products whilst the withdrawn portion is replenished by the introduction into the oxidation vessel of fresh olefine.

The following examples illustrate the manner in which the process of the invention may be carried out.

Example 1

427 grams of butene (containing about 7% butene-1) to which 3 grams of vanadium naphthenate (3% vanadium) had been added was charged into a vertical stainless steel column 1 inch in diameter. The pressure was raised to 30 atmospheres with nitrogen, and the charge was heated electrically to 130° C. Oxygen was then blown in at the base of the column, excess being withdrawn if required through a cooling condenser at the top. When the oxidation started up (as shown by a rise in temperature and absorption of oxygen) the oxidate was pumped from the base of the column, through a cooling condenser and circulated up through cold aqueous potassium carbonate solution spec. grav. $d=1.3$ contained in a similar column from the top of which the oxidate then flowed back into the top of the oxidation column. The size of the apparatus and the charge were such that the majority of the oxidate at any one time was in the oxidation column, while only a small amount was in contact with the alkaline solution. The whole charge was circulated approximately 6 times per hour. After oxidising for 1.75 hours at 120° C. and at a pressure of about 50 atmospheres, 75 litres of oxygen had been absorbed, and the product, including the alkaline solution, was then discharged through a cooling condenser and separated. The upper layer amounting to 530 cc. was fractionated to recover butene, yielding 230 grams of recovered butene, the conversion thus being 46%. The product, after removal of butene, contained 98 grams of $C_4$ epoxide (as estimated by the ethereal HCl method), i. e. a yield of epoxide on butene consumed of 49.5% by weight (or 38.5% of theory). The majority of this epoxide was recoverable by distillation, having B. P. 50–60°/760 mm.

This example may be compared with the following test wherein butene-2 was oxidised in the presence of alkali in the reaction mixture itself, while the passing of the reaction mixture through the removal zone according to the invention was omitted. 244 grams of butene-2 was charged into a steel autoclave together with a solution of 20 grams of potassium bicarbonate, 10 grams of potassium sulphate and 1 gram of sodium vanadate in 50 cc. of water. The autoclave was pressurised with nitrogen to 20 atmospheres and heated to 120° C., the pressure then being 40–45 atmospheres. Oxygen was then forced in 5 to 10 atmospheres at a time, fresh oxygen being added when the previous addition had been largely absorbed. In this way in 3 to 3.5 hours about 20 litres of oxygen were absorbed. The product was cooled and worked up. It yielded 154 grams of recovered butene, thus showing a conversion of 37%. Distillation of the product after removal of unconverted butene gave 21 grams of butene epoxide, that is 24% by weight yield on butene consumed.

Example 2

An olefine mixture containing about 92% by weight of butene-2 and 8% of butene-1 was oxidised in a continuous manner in an apparatus as shown diagrammatically in the accompanying drawing. In this apparatus the oxidation chamber 1 is constructed of suitable corrosion resisting material and heated by a jacket to the reaction temperature of about 130–140° C. Oxygen is admitted at the base of this chamber at A. To the top of 1 is attached a jacketed chamber 2 which may be cooled, if desired. The volume of the oxidation chamber 1 was 900 cc. 450 cc. of the butene mixture was charged per hour through B into chamber 1. At the bottom of chamber 1 the reaction mixture is withdrawn by means of the circulation pump 5 through cooler 3 and a filter 4, and pumped into the washing tower 6 which was charged with an acid removing solution containing 18% by weight of sodium carbonate in water, which was maintained at 30° C. The feed rate of this washing solution, which was introduced into the system at C and passed with the reaction mixture into the washing zone 6, was 100 cc. per hour. The oxidate from which the acids have been partly or completely removed during the passage through chamber 6 and excess of the acid removing solution overflow from 6 into the separator 7 from which the aqueous layer is withdrawn through valve 9. The oxidate is then returned to chamber 2 and thus back into the oxidation chamber 1. The oxidate and effluent gas pass over from the top of 2 to the gas-liquid separator 8 from which gas is withdrawn through valve 10 and the oxidate through valve 11. Nitrogen or any other inert gas the introduction of which may be necessary or desired to maintain the contents of the gas space in the apparatus outside the explosive limits may be introduced through D.

Oxygen was introduced into the system through A at the rate of 60 to 70 litres per hour under a pressure of 50 atmospheres and the rate of nitrogen introduction was 10 litres per hour. The oxidate was circulated by means of circulation pump 5 at the rate of 3 to 4 litres per hour. To the butene mixture was added 0.1% by weight of vanadium naphthenate as catalyst. The oxidation mixture which was withdrawn through 11 was practically free of titrable acid and contained about 25% by weight of butene epoxide, when the steady state of the oxidation was attained in the oxidation chamber and in a contact time of about 2½ hours. The conversion, that is the ratio of butene consumed to total butene fed into the system during a measured period of continuous operation, was 45%. The yield of epoxide obtained, determined by analysis was 43% molar on butene consumed or 46.5% on butene-2 consumed. The epoxide was isolated from the oxidation mixture by fractional distillation when the epoxide came over as a fraction boiling at 50–60° C. and containing 90 to 95% butene-2 epoxide and practically no butene-1 epoxide. In addition small amounts of esters, for instance methyl acetate, aldehydes such as acetaldehyde, crotonaldehyde, ketones such as methylethyl ketone were produced. From the acid removing aqueous carbonate solution formic, acetic and propionic acids were isolated.

We claim:

1. A process for the manufacture of epoxides from olefines having not less than three carbon atoms in the molecule which comprises passing said olefine in the liquid phase in conjunction with an oxidation catalyst selected from the group consisting of organic salts of copper, manganese, vanadium and cobalt with molecular oxygen through a reaction zone at a temperature between 100° and 180° C. at superatmospheric pressure, conducting the oxidation mixture issuing from the reaction zone through a separate zone wherein said mixture is rendered substantially acid free and recycling the residual mixture containing epoxide and olefine with molecular oxygen to the reaction zone.

2. A process in accordance with claim 1 in which the oxidation mixture is rendered acid free by passing it through a medium selected from the group consisting of water, water containing a basic substance and water containing a salt of an acid weaker than the acid to be removed.

3. A process according to claim 1, wherein the olefine to be oxidised is n-butene-2 and the epoxide produced 2:3-epoxy-n-butene.

4. A process according to claim 1, wherein the removal of the acids from the oxidate is partial.

5. A process according to claim 1, wherein the temperature in the zone wherein the acid is removed from the oxidate is below the temperature in the oxidation zone.

6. A process according to claim 1, wherein the temperature in the acid removal zone is not higher than 50° C.

7. A process according to claim 1, wherein the pressure prevailing in the acid removal zone is such that the oxidation reaction mixture is maintained in the liquid state.

8. A process according to claim 1, wherein the removal of the acids is effected by passing the oxidation reaction mixture over a solid substance of a basic nature.

9. A process according to claim 1, wherein the oxidate is passed through an aqueous medium in counter-current therewith.

10. A process for the manufacture of epoxides from olefines having not less than three carbon atoms in the molecule which comprises passing said olefine in the liquid phase in conjunction with an oxidation catalyst selected from the group consisting of organic salts of copper, manganese, vanadium and cobalt with molecular oxygen through a reaction zone at a temperature between 100° and 180° C. at superatmospheric pressure, conducting the oxidation mixture issuing from the reaction zone through a separate zone containing an aqueous medium containing salts to reduce the solubility therein of compounds other than acids wherein said mixture is rendered substantially acid free and recycling the residual mixture containing epoxide and olefine with molecular oxygen to the reaction zone.

11. A process for the manufacture of epoxides from olefines having not less than three carbon atoms in the molecule which comprises passing said olefine in the liquid phase in conjunction with an oxidation catalyst selected from the group consisting of organic salts of copper, manganese, vanadium and cobalt with molecular oxygen through a reaction zone at a temperature between 100° and 180° C. at superatmospheric pressure, conducting the oxidation mixture issuing from the reaction zone through a separate zone containing an aqueous medium at a rate per hour of at least three times the volume contained in the oxidation zone, said mixture being rendered substantially acid free and recycling the residual mixture containing epoxide and olefine with molecular oxygen to the reaction zone.

12. A process for the manufacture of epoxides from olefines having not less than three carbon atoms in the molecule which comprises passing said olefine in the liquid phase in conjunction with an oxidation catalyst selected from the group consisting of organic salts of copper, manganese, vanadium and cobalt with molecular oxygen through a reaction zone at a temperature between 100° and 180° C. at superatmospheric pressure, conducting the oxidation mixture issuing from the reaction zone through a separate zone containing an aqueous medium which removes the epoxide and acids from the oxidate and recovering the epoxide by fractional distillation.

13. A process for the manufacture of epoxides from olefines which comprises passing an olefine selected from the group consisting of propylene, butenes including n-butenes, pentenes including pentene-1 and pentene-2, hexenes including hexene-1 and methyl pentene, heptenes including heptene cuts from petroleum sources, octenes including alpha and beta di-isobutene, in the liquid phase in conjunction with an oxidation catalyst selected from the group consisting of organic salts of copper, manganese, vanadium and cobalt with molecular oxygen through a reaction zone at a temperature between 100° and 180° C. at superatmospheric pressure, conducting the oxidation mixture issuing from the reaction zone through a separate zone wherein said mixture is rendered substantially acid free and recycling the residual mixture containing epoxide and olefine with molecular oxygen to the reaction zone.

14. A process for the manufacture of epoxides which comprises a mixture of n-butene-2 and a small amount of n-butene-1 in the liquid phase in conjunction with an oxidation catalyst selected from the group consisting of organic salts of copper, manganese, vanadium and cobalt with molecular oxygen through a reaction zone at a temperature between 100° and 180° C. at super atmospheric pressure, conducting the oxidation mixture issuing from the reaction zone through a separate zone wherein said mixture is rendered substantially acid free and recycling the residual mixture containing epoxide, butene-2 and butene-1 with molecular oxygen to the reaction zone and recovering butene-2 epoxide practically free from butene-1 epoxide.

References Cited in the file of this patent

UNITED STATES PATENTS

| | | |
|---|---|---|
| 1,995,991 | Lenher | Mar. 26, 1935 |
| 2,052,195 | Schneider | Aug. 25, 1936 |
| 2,316,604 | Loder et al. | Apr. 13, 1943 |
| 2,475,605 | Prutton et al. | July 12, 1949 |
| 2,530,509 | Cook | Nov. 21, 1950 |
| 2,644,837 | Schweitzer | July 7, 1953 |